(12) United States Patent
Kim

(10) Patent No.: US 10,995,668 B2
(45) Date of Patent: May 4, 2021

(54) TURBINE VANE, TURBINE, AND GAS TURBINE INCLUDING THE SAME

(71) Applicant: DOOSAN HEAVY INDUSTRIES & CONSTRUCTION CO., LTD., Changwon-si (KR)

(72) Inventor: Jin Uk Kim, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/038,181

(22) Filed: Jul. 18, 2018

(65) Prior Publication Data

US 2019/0085769 A1 Mar. 21, 2019

(30) Foreign Application Priority Data

Sep. 20, 2017 (KR) ........................ 10-2017-0121200

(51) Int. Cl.
*F02C 7/18* (2006.01)
*F01D 5/22* (2006.01)
*F01D 9/04* (2006.01)
*F01D 9/06* (2006.01)

(52) U.S. Cl.
CPC ................ *F02C 7/18* (2013.01); *F01D 5/225* (2013.01); *F01D 9/042* (2013.01); *F01D 9/065* (2013.01); *F05D 2240/14* (2013.01); *F05D 2240/81* (2013.01); *F05D 2250/14* (2013.01); *F05D 2260/201* (2013.01); *F05D 2260/202* (2013.01)

(58) Field of Classification Search
CPC .......... F01D 9/042; F01D 9/023; F01D 9/065; F01D 5/225; F05D 2240/81; F05D 2250/141; F05D 2250/70; F05D 2250/71
See application file for complete search history.

(56) References Cited

U.S. PATENT DOCUMENTS

2012/0177479 A1* 7/2012 Azad ...................... F01D 5/187
   415/115
2018/0128113 A1* 5/2018 Hoffman ................... F01D 5/18

FOREIGN PATENT DOCUMENTS

JP 2008-057537 A 3/2008
KR 20-0174662 Y1 4/2000

* cited by examiner

*Primary Examiner* — David E Sosnowski
*Assistant Examiner* — Danielle M. Christensen
(74) *Attorney, Agent, or Firm* — INVENSTONE Patent, LLC

(57) ABSTRACT

A turbine vane of a multi-stage arrangement of turbine vanes cooled by compressed air supplied from a compressor of a gas turbine has an improved structure capable of preventing an unintended removal of cooling holes along with the intended removal of an excess portion of a shroud. The turbine vane includes an airfoil configured to be installed on an inner peripheral surface of a turbine casing in which combustion gas supplied from a combustor flows and to guide combustion gas from a front-stage blade to a rear-stage blade; and a pair of shrouds coupled to the airfoil, at least one of the shrouds having a plurality of cooling holes formed toward the airfoil, wherein the plurality of cooling holes are formed along an imaginary line that is spaced apart from and surrounds the airfoil.

11 Claims, 5 Drawing Sheets

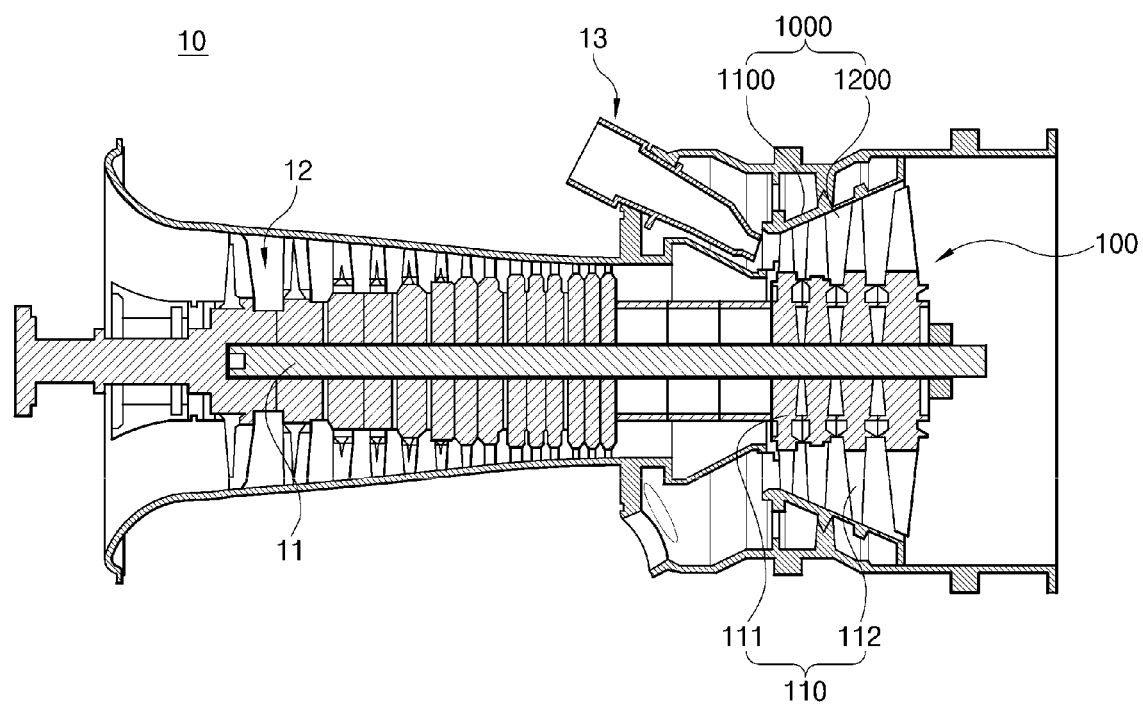
[FIG. 1]

[FIG. 2]
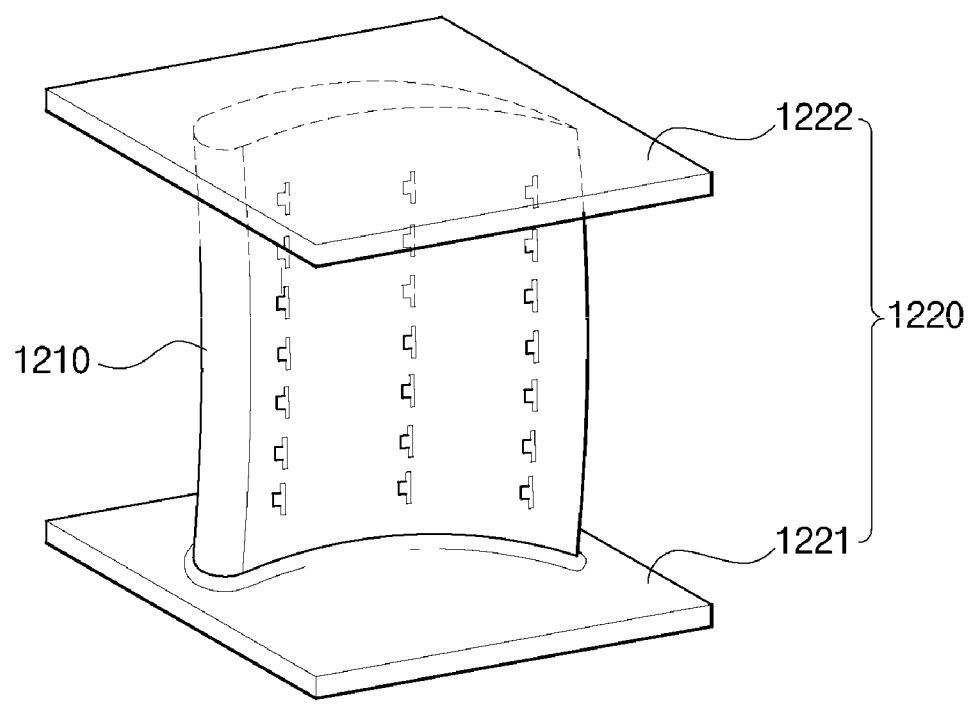

[FIG. 3]
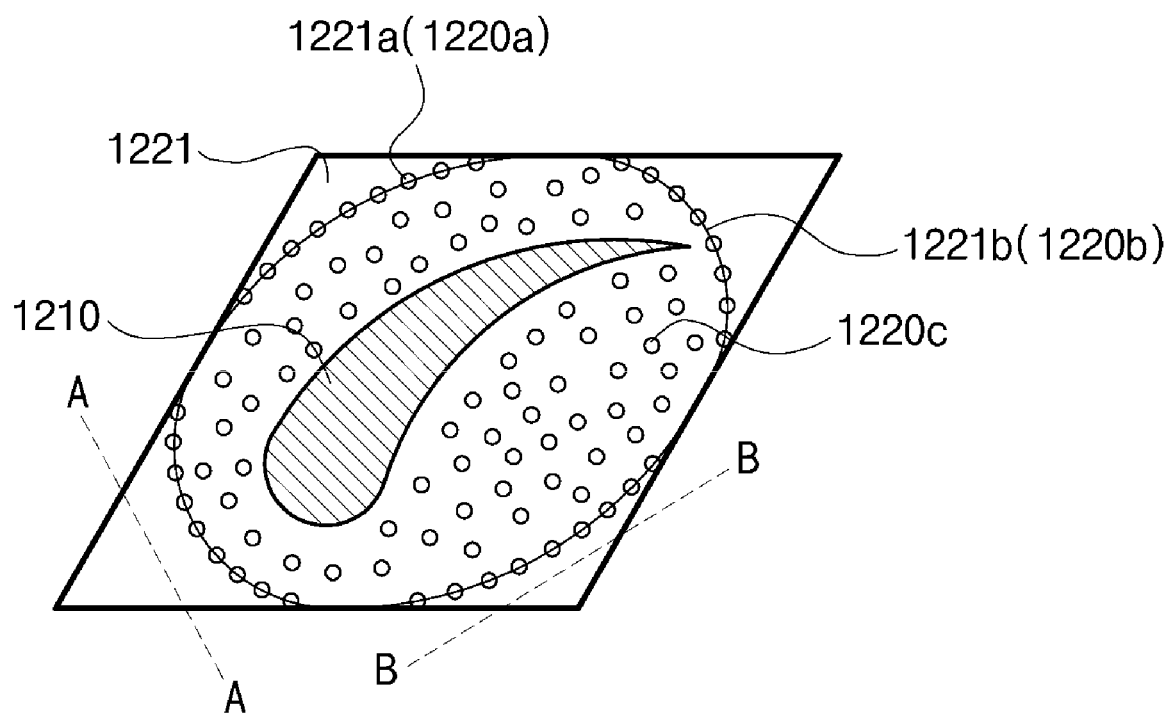

[FIG. 4]
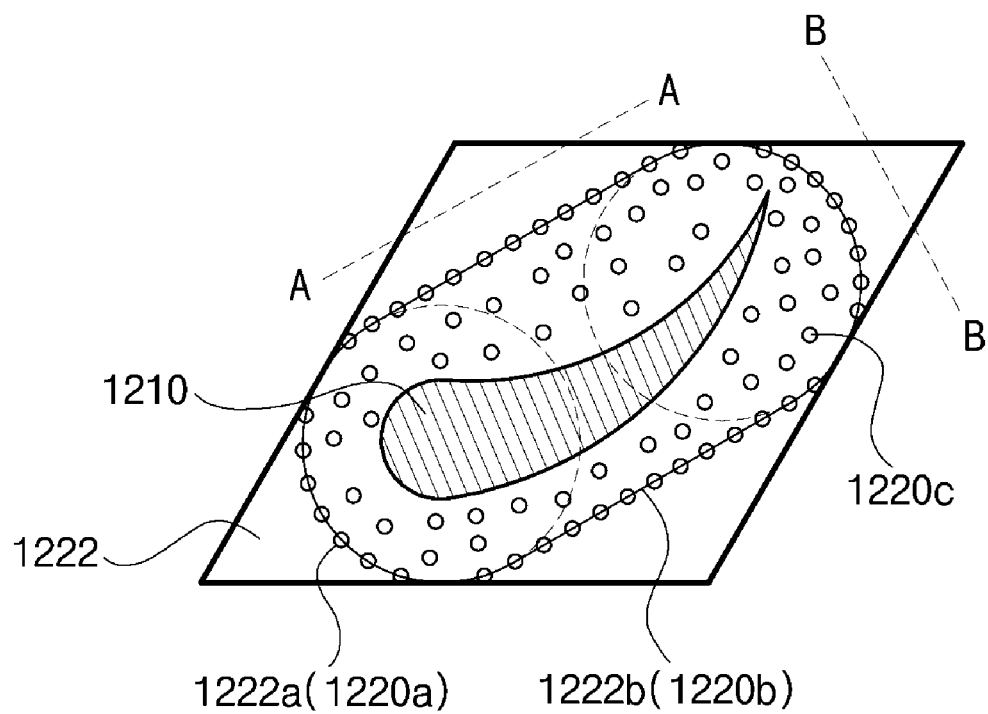

[FIG. 5]
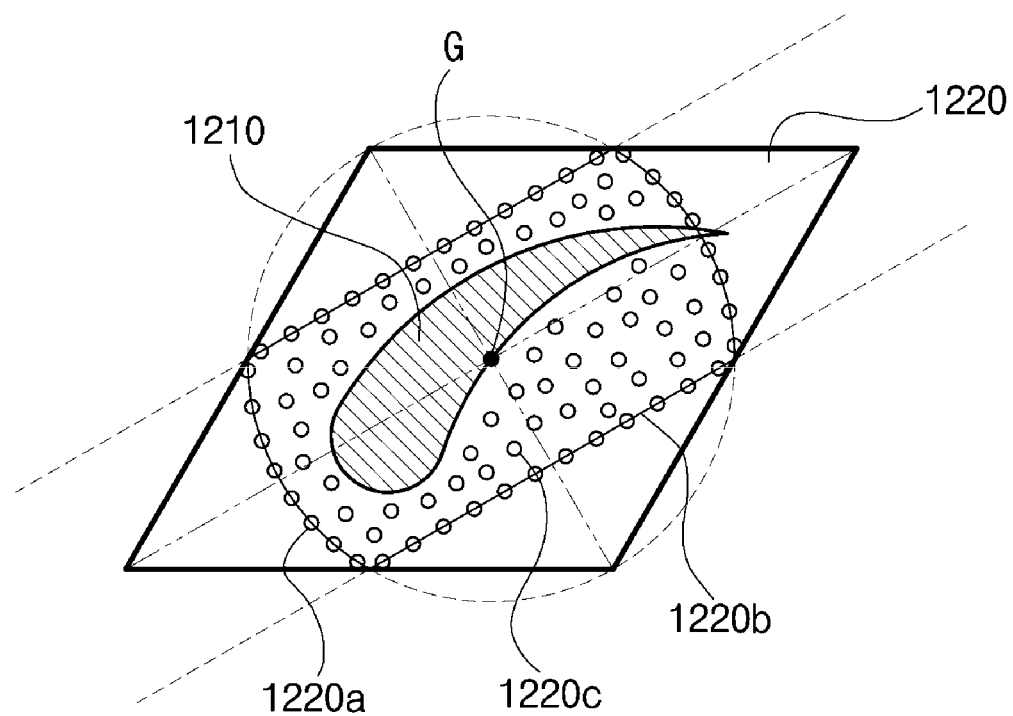

TURBINE VANE, TURBINE, AND GAS TURBINE INCLUDING THE SAME

CROSS-REFERENCE TO RELATED APPLICATIONS

This application claims priority to Korean Patent Application No. 10-2017-0121200, filed on Sep. 20, 2017, the disclosure of which is incorporated herein by reference in its entirety.

BACKGROUND OF THE INVENTION

Field of the Invention

Exemplary embodiments of the present disclosure relate to a turbine vane, a turbine, and a gas turbine including the same, and more particularly, to a turbine vane consisting of multi-stage turbine vanes arranged in a flow direction of combustion gas so that the combustion gas transmitted from a front-stage turbine vane is guided to a rear-stage turbine vane, a turbine, and a gas turbine including the same.

Description of the Related Art

A gas turbine generally includes a compressor, a combustor, and turbine. The compressor has a compressor inlet scroll strut for the introduction of air, and includes a plurality of compressor vanes and compressor blades alternately arranged in a compressor casing. The combustor mixes fuel with the air compressed by the compressor to ignite the mixture with a burner, thereby producing high-temperature and high-pressure combustion gas.

The turbine includes a plurality of turbine vanes and turbine blades alternately arranged in a turbine casing. A tip clearance is defined as a gap between the turbine casing and each of the turbine blades. In addition, a tie rod is arranged to pass through the centers of the compressor, combustor, turbine and exhaust chamber. The tie rod is rotatably supported at both ends by bearings. A plurality of disks are fixed to the tie rod, and the blades are connected to each of the disks. A drive shaft of a generator or the like is connected to the end of the exhaust chamber.

This gas turbine is advantageous in that it consumes a very small amount of lubricant, has a significantly reduced amplitude which is a characteristic of reciprocating machines, and operates at a high speed because it does not have a reciprocating device such as a piston in a four-stroke engine to have no friction portion between the piston and the cylinder causing deterioration.

Briefly, the gas turbine is operated in such a manner that the air compressed by the compressor is mixed with fuel for combustion to produce hot combustion gas and the produced combustion gas is injected into the turbine. The injected combustion gas generates torque while flowing through the turbine vanes and the turbine blades, thereby rotating a rotor.

Each of the turbine vanes includes an airfoil and a shroud coupled to the end of the airfoil. The shroud has a plurality of cooling holes formed toward the airfoil.

In this case, the gas turbine is manufactured by first forming cooling holes in the shroud, removing an excess portion of the shroud, and then coupling the vane to the inner peripheral surface of the turbine casing. This gas turbine is problematic in that some of the already formed cooling holes are removed together when a portion of the shroud is removed.

SUMMARY OF THE INVENTION

The present disclosure has been made in view of the above-mentioned problems, and an object thereof is to provide a turbine vane having an improved structure capable of preventing an unintended removal of cooling holes along with the intended removal of an excess portion of a shroud. The present disclosure has a further object to provide a turbine and a gas turbine including a turbine vane having the improved structure.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided a turbine vane of a multi-stage arrangement of turbine vanes cooled by compressed air supplied from a compressor of a gas turbine. The turbine vane may include an airfoil configured to be installed on an inner peripheral surface of a turbine casing in which combustion gas supplied from a combustor flows and to guide combustion gas from a front-stage blade to a rear-stage blade; and a pair of shrouds coupled to the airfoil, at least one of the shrouds having a plurality of cooling holes formed toward the airfoil. The plurality of cooling holes may be formed along an imaginary line that is spaced apart from and surrounds the airfoil.

In accordance with another aspect of the present disclosure, there is provided a turbine to generate power for generation of electric power, the turbine being cooled by compressed air supplied from a compressor of a gas turbine. The turbine may include a stator comprising a casing and multi-stage vanes fixed to the casing and arranged in a flow direction of combustion gas supplied from a combustor to flow in the turbine; and a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes. Each of the vanes may be consistent with the above turbine vane.

In accordance with another aspect of the present disclosure, a gas turbine may include a compressor to suck and compress air, a combustor to mix compressed air supplied from the compressor with fuel for combustion, and a turbine to generate power for generation of electric power by allowing combustion gas supplied from the combustor to flow in the turbine, the turbine being cooled by the compressed air supplied from the compressor. The turbine may be consistent with the above turbine. The imaginary line may form an ellipse that is tangent to edges of the shroud. In another embodiment, the imaginary line may be an outline of a figure formed by a first circle tangent to two edges at one side of the shroud, a second circle tangent to two edges at other side of the shroud, and two line segments, each of which is circumscribed about the first and second circles so as not to intersect with each other. In another embodiment, the imaginary line may be an inner line of a figure formed by a circle, which is formed around a center of gravity of the shroud and the radius of which is defined as the shortest among distances between the center of gravity and respective vertices of the shroud, and a pair of straight lines which are parallel to the longest among lines connecting the center of gravity and the respective vertices of the shroud while passing through points at which the circle meets edges of the shroud.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic cross-sectional view of a gas turbine to which an embodiment of the present disclosure is applied;

FIG. 2 is a perspective view of a turbine vane included in the gas turbine of FIG. 1;

FIG. 3 is a view of an airfoil-side surface of a shroud of FIG. 2, illustrating an imaginary line of a turbine vane according to a first embodiment of the present disclosure;

FIG. 4 is a view of an airfoil-side surface of a shroud of FIG. 2, illustrating an imaginary line of a turbine vane according to a second embodiment of the present disclosure; and FIG. 5 is a view of an airfoil-side surface of a shroud of FIG. 2, illustrating an imaginary line of a turbine vane according to a third embodiment of the present disclosure.

DESCRIPTION OF SPECIFIC EMBODIMENTS

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a turbine vane, a turbine, and a gas turbine including the same according to exemplary embodiments of the present disclosure will be described with reference to the accompanying drawings.

FIG. 1 illustrates an example of a gas turbine 10 according to the present disclosure. The gas turbine 10 includes a casing and a turbine diffuser disposed behind the casing for discharge of combustion gas having passed through a turbine 100. A combustor 13 is disposed in front of the turbine diffuser for combustion of compressed air supplied from a compressor 12. In terms of airflow direction, the compressor 12 is disposed upstream of the turbine 100.

The casing of the gas turbine 10 includes a compressor casing and a turbine casing 1100. The compressor casing accommodates compressor vanes and compressor rotors, and the turbine casing 1100 accommodates turbine vanes 1200 and turbine rotors 110. A torque tube as a torque transmission member is disposed between the compressor 12 and the turbine 100 to transmit a rotational torque generated in the turbine to the compressor.

Each of the compressor rotors includes a compressor disk and compressor blades. A plurality of compressor disks (e.g., fourteen disks) is accommodated in the compressor casing, and these individual compressor disks are fastened by a tie rod 11 so as not to be axially separated from each other.

In detail, the compressor disks are axially aligned in the state in which the tie rod 11 passes through the substantial centers of the respective compressor disks. Here, the compressor disks are arranged so that the facing surfaces of adjacent compressor disks, pressed together by the tie rod 11, are not rotatable relative to each other.

A plurality of compressor blades are radially coupled to the outer peripheral surface of each compressor disk. A plurality of compressor vanes are fixedly arranged in the compressor casing, alternately with the compressor disks, so as to be respectively disposed between adjacent compressor disks. The compressor vanes are fixed so as not to rotate, unlike the compressor disks, and serve to align the flow of compressed air having passed through upstream compressor blades and to guide the compressed air to compressor blades arranged downstream. In this case, the compressor casing and the compressor vanes may define a comprehensive compressor stator, to distinguish the compressor stator from the compressor rotor.

The tie rod 11 is disposed to pass through the centers of the compressor disks and the turbine disks. One end of the tie rod 11 is fastened to a compressor disk positioned at the most upstream side, and the other end is fastened by a fastening nut.

The tie rod is not limited to the structure shown in FIG. 1 may be variously configured according to the gas turbine. That is, one tie rod may pass through the centers of compressor disks and turbine disks (as shown), a plurality of tie rods may be arranged circumferentially, or a combination of these may be used.

Although not illustrated in the drawings, a deswirler serving as a guide vane may be installed in the compressor of the gas turbine in order to adapt the angle of flow of fluid, entering into the inlet of the combustor after the pressure of the fluid is increased, to a design angle of flow.

The combustor mixes the compressed air introduced thereinto with fuel for combustion to produce high-temperature and high-pressure combustion gas with high energy, and increases the temperature of the combustion gas to a temperature at which the combustor and turbine components are able to be resistant to heat in a constant-pressure combustion process.

The constituent combustor of the combustion system of the gas turbine may consist of a plurality of combustors arranged in a combustor casing in the form of a cell, and includes a nozzle for injection of fuel, a liner that forms a combustion chamber, and a transition piece that is a connection between the combustor and the turbine.

In detail, the liner defines a combustion space in which the fuel injected from the fuel nozzle is mixed with the compressed air from the compressor for combustion. The liner may include a combustion chamber as the combustion space in which the fuel mixed with air is burned, and a liner annular passage that defines an annular space while surrounding the combustion chamber. The nozzle for injection of fuel is coupled to the front end of the liner, and an igniter is coupled to the side wall of the liner.

The compressed air, which is introduced through a plurality of holes arranged in the outer wall of the liner, flow in the liner annular passage, and the compressed air used to cool the transition piece (described below) also flows through the liner annular passage. Since the compressed air flows along the outer wall of the liner, it is possible to prevent thermal damage to the liner due to heat generated by combustion of fuel in the combustion chamber.

The transition piece is connected to the rear end of the liner to send the combustion gas burned by an ignition plug to the turbine. Similar to the liner, the transition piece has a transition piece annular passage surrounding the internal space thereof, and the outer wall of the transition piece is cooled by the compressed air flowing along the transition piece annular passage, thereby preventing damage to the transition piece due to the high temperature of combustion gas.

Meanwhile, the high-temperature and high-pressure combustion gas discharged from the combustor is supplied to the turbine. The high-temperature and high-pressure combustion gas supplied to the turbine gives impingement or reaction force to turbine blades while expanding, to generate a rotational torque. The obtained rotational torque is transmitted via the torque tube to the compressor, and the power beyond that for driving the compressor is used to drive a generator or the like.

The turbine 100 basically has a structure similar to the compressor 12. That is, the turbine 100 includes a plurality of turbine rotors 110 similar to the compressor rotors of the compressor 12. Thus, each of the turbine rotors 110 similarly includes a turbine disk 111 and a plurality of turbine blades 112 arranged radially. A plurality of turbine vanes 1200 fixed to the turbine casing are each arranged between the turbine blades 112 to guide the flow direction of combustion gas having passed through the turbine blades 112. In this case, the turbine casing 1100 and the turbine vanes 1200 may define a comprehensive turbine stator 1000, to distinguish the turbine stator 1000 from the turbine rotor 110.

Referring to FIG. 2, each of the turbine vanes 1200 includes an airfoil 1210 and a pair of shrouds 1220. The airfoil 1210 serves to guide combustion gas having passed through a front-stage turbine blade 112 to a rear-stage turbine blade 112. The shrouds 1220 include an inner shroud 1221 and an outer shroud 1222. The inner shroud 1221 is coupled to the inner end of the airfoil 1210 directed toward the tie rod 11, and the outer shroud 1222 is coupled to the outer end of the airfoil 1210 directed toward the casing 1100 to be inserted onto the inner peripheral surface of the casing 1100. The outer shroud 1222 fixes the vane 1200 to the casing 1100.

Referring to FIGS. 3 and 4, a plurality of cooling holes 1220a (1221a and/or 1222a) may be formed in one or both of the pair of shrouds 1220, such that cooling air is directed toward the airfoil 1210 through the cooling holes. That is, as illustrated in FIG. 3, a plurality of inner cooling holes 1221a may be formed in the airfoil-side (upper) surface of the inner shroud 1221 to direct cooling air toward the airfoil 1210. In addition, as illustrated in FIG. 4, a plurality of outer cooling holes 1222a may be formed in the airfoil-side (lower) surface of the outer shroud 1222 to direct cooling air toward the airfoil 1210. Although FIG. 3 illustrates the inner shroud and FIG. 4 illustrates the outer shroud, they are by way of example only. Of course, the shroud of FIG. 3 may be an outer shroud and the shroud of FIG. 4 may be an inner shroud.

The cooling holes 1220a allow the compressed air generated by and supplied from the compressor 12 to the casing 1100 to be discharged from the airfoil-side surface of one or both of the inner and outer shrouds 1221 and 1222. The compressed air discharged through the cooling holes 1220a may flow along the airfoil-side surfaces of the inner and outer shrouds 1221 and 1222 and the surface of the airfoil 1210 to cool the surfaces. Thus, the cooling holes 1220a can prevent thermal damage to the turbine vane 1200 due to high-temperature and high-pressure combustion gas.

The cooling holes 1220a are formed at equal intervals along an imaginary line 1220b (1221b and/or 1222b) which is spaced apart from and surrounds the airfoil 1210. In more detail, the inner cooling holes 1221a may be formed along an inner imaginary line 1221b, which is spaced apart from and surrounds the perimeter (footprint) of the airfoil 1210 and which occurs on the airfoil-side surface of the inner shroud 1221. In addition, the outer cooling holes 1222a may be formed along an outer imaginary line 1222b, which is spaced apart from and surrounds the perimeter (footprint) of the airfoil 1210 and which occurs on the airfoil-side surface of the outer shroud 1222. Each of FIGS. 3 and 4 is a view from the airfoil 1210.

Here, a process of installing the vane 1200 to the inner peripheral surface of the casing 1100 will be described in brief. First, the cooling holes 1220a are formed in each of the shrouds 1220. Subsequently, in order for the airfoil 1210 and the shroud 1220 to be inclined at a corresponding angle, the angle formed by the airfoil 1210 and an adjacent airfoil 1210 is measured and an optimal angle is calculated according to the specifications of the gas turbine 10 to be designed, with respect to the same stage. Then, the vane 1200 is installed to the casing 1100 by removing an excess portion of the shroud 1220 (e.g., a portion interfere with an adjacent shroud 1220) and then inserting the outer shroud 1222 onto the inner peripheral surface of the casing 1100.

If the cooling holes 1220a were to be irregularly formed in the shroud 1220 rather than along the imaginary line 1220b, the already formed cooling holes 1220a might be unintentionally removed from the shroud 1220 along with the intentional removal of the excess portion of the shroud 1220. However, in the case where the cooling holes 1220a are formed along the imaginary line 1220b, the cooling holes 1220a cannot be removed even though a portion of the shroud 1220 is removed along line "A-A" or line "B-B" as illustrated in FIGS. 3 and 4. Therefore, in accordance with the turbine vane 1200, the turbine 100, and the gas turbine 10 including the same of the present disclosure, it is possible to reduce costs to manufacture products and enhance the overall efficiency of the gas turbine 10 by minimizing removal of the cooling holes 1220a.

Referring to FIG. 3, the imaginary line 1220b may form an ellipse that is tangent to each of four surface edges of the shroud 1220, with respect to one or both of the airfoil-side surfaces of the inner and outer shrouds 1221 and 1222. In this case, the major axis of the ellipse may be aligned in the longitudinal direction of the airfoil 1210 and the minor axis of the ellipse may be aligned in the thickness direction of the airfoil 1210.

Referring to FIG. 4, the imaginary line 1220b may correspond to an outline of the figure formed by a combination of two circles and two line segments, which occur on one or both of the airfoil-side surfaces of the inner and outer shrouds 1221 and 1222. In more detail, the imaginary line 1220b may be an outline of the figure formed by a first circle tangent to two adjacent edges of the surface edges of the shroud 1220, a second circle tangent to the two other adjacent edges, and two line segments, each of which is circumscribed about the first and second circles.

Here, the two segments are each circumscribed about the first and second circles so as not to cross the airfoil 1210, that is, so as not to intersect with each other between the first circle and the second circle. In addition, the outline refers to a periphery of the figure formed by arcs of the first and second circles, excluding the portion of the circle occurring between the two line segments, and the two line segments, which respectively connect the adjacent-edge tangent points of the first and second circles.

Referring to FIG. 5, the imaginary line 1220b may correspond to an outline of the figure bounded by a portion of a circle around the center of gravity G of the shroud 1220 and a pair of straight lines drawn through the circle, which occur on one or both of the airfoil-side surfaces of the inner and outer shrouds 1221 and 1222. In more detail, the imaginary line 1220b may correspond to an inner line of the figure formed by a circle, which is formed around the center of gravity G of the shroud 1220 and the radius of which is defined as the shortest among distances between the center of gravity G and the respective vertices of the shroud 1220, and a pair of straight lines which are parallel to the longest among lines connecting the center of gravity G and the respective vertices of the shroud 1220 while passing through the points at which the circle meets the edges of the shroud 1220.

In the case where the surface of the shroud 1220 forms a parallelogram as illustrated in FIG. 5, the inner line corresponds to an outline of the figure formed by two line segments made by excluding straight lines present outside the circle and two arcs made by excluding a portion of the circle present outside the surface of the shroud 1220.

However, if the surface of the shroud 1220 does not form a point symmetry figure, that is, if the surface edges of the shroud 1220 are not symmetrical with respect to the center of gravity G of the shroud 1220, a plurality of straight lines, which are parallel to the longest one of the line segments made by connecting the center of gravity G of the surface of the shroud 1220 to one of the vertices of the surface of the shroud 1220, and passing through the points at which the circle meets the edge of the surface of the shroud 1220, may be present at each of both sides with the center of gravity G interposed therebetween. In this case, there is one straight line closest to the center of gravity G among a first group of a plurality of straight lines disposed at one side of the center of gravity G, and the other straight line closest to the center of gravity G among a second group of a plurality of straight lines disposed at the other side of the center of gravity G. And each of these two straight lines penetrate the circle. The inner line corresponds an outline of the figure formed by two line segments made by excluding straight lines present outside the circle and two arcs made by excluding a portion present outside the two line segments.

The inclination of the airfoil 1210 to an adjacent airfoil 1210 may vary with each drive specification of the gas turbine 10. Accordingly, by selecting an appropriate type suitable for the inclination of the airfoil 1210 from among the various types of imaginary lines 1220b, it is possible to minimize the number of cooling holes 1220a to be removed or rearranged when the vane 120 is installed to the inner peripheral surface of the casing 1100.

Meanwhile, the shroud 1220 may further have auxiliary cooling holes 1220c in addition to the cooling holes 1220a. The auxiliary cooling holes 1220c are formed at a portion between the imaginary line 1220b and the airfoil 1210 in the shroud 1220. Thus, the auxiliary cooling holes 1220c enable compressed air to be injected onto the surface of the airfoil 1210 to more effectively cool the surface of the airfoil 1210.

As described above, in accordance with the turbine vane 1200, the turbine 100, and the gas turbine 10 including the same of the present disclosure, it is possible to prevent an unwanted removal of cooling holes 1220a (1221a and/or 1222a) along with the removal of an excess portion of the shroud 1220, since the cooling holes 1220a are formed along the various types of imaginary lines 1220b (1221b and/or 1222b), and to enhance productivity of the gas turbine since there is no need to rearrange the cooling holes 1220a according to the rotation of the shroud 1220.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the true technical protection scope of the present disclosure should be defined by technical concepts of the appended claims.

What is claimed is:

1. A turbine vane of a multi-stage arrangement of turbine vanes cooled by compressed air supplied from a compressor of a gas turbine, the turbine vane comprising:

an airfoil configured to be installed on an inner peripheral surface of a turbine casing in which combustion gas supplied from a combustor flows and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, and wherein the imaginary line forms an ellipse that is drawn inside four edges of the at least one of the inner and outer shrouds and that is tangent to each of the four edges.

2. A turbine vane of a multi-stage arrangement of turbine vanes cooled by compressed air supplied from a compressor of a gas turbine, the turbine vane comprising:

an airfoil configured to be installed on an inner peripheral surface of a turbine casing in which combustion gas supplied from a combustor flows and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, wherein each of the at least one of the inner and outer shrouds includes a first side having two edges that are adjacent to each other, and a second side having two edges that are adjacent to each other and being disposed diagonally opposite to the first side, and wherein the imaginary line is an outline of a figure formed by a first circle tangent to each of the two edges of the first side of the at least one of the inner and outer shrouds, a second circle tangent to each of the two edges of the second side of the at least one of the inner and outer shrouds, and two line segments, each of which is circumscribed about the first and second circles so as not to intersect with each other.

3. A turbine vane of a multi-stage arrangement of turbine vanes cooled by compressed air supplied from a compressor of a gas turbine, the turbine vane comprising:

an airfoil configured to be installed on an inner peripheral surface of a turbine casing in which combustion gas supplied from a combustor flows and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, and wherein the imaginary line is an inner line of a figure formed by a circle, which is formed around a center of gravity of the at least one of the inner and outer shrouds and the radius of which is defined as the shortest among distances between the center of gravity and respective vertices of the at least one of the inner and outer shrouds, and a pair of straight lines which are parallel to the longest among lines connecting the center of gravity and the respective vertices of the at least one of the inner and outer shrouds while passing through points at which the circle meets edges of the at least one of the inner and outer shrouds.

4. The turbine vane according to claim 3, wherein the plurality of second cooling holes are dispersed throughout the proximal portion between the imaginary line and the airfoil.

5. A turbine to generate power for generation of electric power, the turbine being cooled by compressed air supplied from a compressor of a gas turbine, the turbine comprising:

a stator comprising a casing and multi-stage vanes fixed to the casing and arranged in a flow direction of combustion gas supplied from a combustor to flow in the turbine; and a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes, wherein each of the vanes comprises:

an airfoil configured to be installed on an inner peripheral surface of the casing and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, and wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, and wherein the imaginary line forms an ellipse that is drawn inside four edges of the at least one of the inner and outer shrouds and that is tangent to each of the four edges.

6. A turbine to generate power for generation of electric power, the turbine being cooled by compressed air supplied from a compressor of a gas turbine, the turbine comprising:

a stator comprising a casing and multi-stage vanes fixed to the casing and arranged in a flow direction of combustion gas supplied from a combustor to flow in the turbine; and a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes, wherein each of the vanes comprises:
an airfoil configured to be installed on an inner peripheral surface of the casing and to guide combustion gas from a front-stage blade to a rear-stage blade; and
a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein
the plurality of cooling holes include a plurality of first cooling holes and a plurality of second cooling holes,
the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil,
the plurality of first cooling holes are disposed along the imaginary line, and
the plurality of second cooling holes are disposed so as to occupy the proximal portion,
the pair of shrouds comprise an inner shroud coupled to an inner end of the airfoil; and an outer shroud coupled to an outer end of the airfoil, and
the imaginary line occurs on the airfoil-side surface of both of the inner and outer shrouds, such that the first and second cooling holes are formed in at least one of the inner and outer shrouds, wherein each of the at least one of the inner and outer shrouds includes
a first side having two edges that are adjacent to each other, and
a second side having two edges that are adjacent to each other and being disposed diagonally opposite to the first side, and wherein the imaginary line is an outline of a figure formed by
a first circle tangent to each of the two edges of the first side of the at least one of the inner and outer shrouds,
a second circle tangent to each of the two edges of the second side of the at least one of the inner and outer shrouds, and
two line segments, each of which is circumscribed about the first and second circles so as not to intersect with each other.

7. A turbine to generate power for generation of electric power, the turbine being cooled by compressed air supplied from a compressor of a gas turbine, the turbine comprising:
a stator comprising a casing and multi-stage vanes fixed to the casing and arranged in a flow direction of combustion gas supplied from a combustor to flow in the turbine; and
a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes, wherein each of the vanes comprises:
an airfoil configured to be installed on an inner peripheral surface of the casing and to guide combustion gas from a front-stage blade to a rear-stage blade; and
a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein
the plurality of cooling holes include a plurality of first cooling holes and a plurality of second cooling holes,
the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil,
the plurality of first cooling holes are disposed along the imaginary line, and
the plurality of second cooling holes are disposed so as to occupy the proximal portion,
the pair of shrouds comprise an inner shroud coupled to an inner end of the airfoil; and an outer shroud coupled to an outer end of the airfoil, and
the imaginary line occurs on the airfoil-side surface of both of the inner and outer shrouds, such that the first and second cooling holes are formed in at least one of the inner and outer shrouds, and wherein the imaginary line is an inner line of a figure formed by
a circle, which is formed around a center of gravity of the at least one of the inner and outer shrouds and the radius of which is defined as the shortest among distances between the center of gravity and respective vertices of the at least one of the inner and outer shrouds, and
a pair of straight lines which are parallel to the longest among lines connecting the center of gravity and the respective vertices of the at least one of the inner and outer shrouds while passing through points at which the circle meets edges of the at least one of the inner and outer shrouds.

8. The turbine vane according to claim 7, wherein the plurality of second cooling holes are dispersed throughout the proximal portion between the imaginary line and the airfoil.

9. A gas turbine comprising a compressor to suck and compress air, a combustor to mix compressed air supplied from the compressor with fuel for combustion, and a turbine to generate power for generation of electric power by allowing combustion gas supplied from the combustor to flow in the turbine, the turbine being cooled by the compressed air supplied from the compressor, wherein the turbine comprises a stator comprising a casing and multi-stage vanes fixed to the casing and arranged in a flow direction of combustion gas supplied from a combustor to flow in the turbine; and a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes, wherein each of the vanes comprises:

an airfoil configured to be installed on an inner peripheral surface of the casing and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, and wherein the imaginary line forms an ellipse that is drawn inside four edges of the at least one of the inner and outer shrouds and that is tangent to each of the four edges.

10. A gas turbine comprising a compressor to suck and compress air, a combustor to mix compressed air supplied from the compressor with fuel for combustion, and a turbine to generate power for generation of electric power by allowing combustion gas supplied from the combustor to flow in the turbine, the turbine being cooled by the compressed air supplied from the compressor, wherein the turbine comprises a stator comprising a casing and multi-stage vanes fixed to the casing and arranged in a flow direction of combustion gas supplied from a combustor to flow in the turbine; and a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes, wherein each of the vanes comprises:

an airfoil configured to be installed on an inner peripheral surface of the casing and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, wherein each of the at least one of the inner and outer shrouds includes a first side having two edges that are adjacent to each other, and a second side having two edges that are adjacent to each other and being disposed diagonally opposite to the first side, and wherein the imaginary line is an outline of a figure formed by a first circle tangent to each of the two edges of the first side of the at least one of the inner and outer shrouds, a second circle tangent to each of the two edges of the second side of the at least one of the inner and outer shrouds, and two line segments, each of which is circumscribed about the first and second circles so as not to intersect with each other.

11. A gas turbine comprising a compressor to suck and compress air, a combustor to mix compressed air supplied from the compressor with fuel for combustion, and a turbine to generate power for generation of electric power by allowing combustion gas supplied from the combustor to flow in the turbine, the turbine being cooled by the compressed air supplied from the compressor, wherein the turbine comprises a stator comprising a casing and multi-stage vanes fixed to the casing and arranged in a flow direction of combustion gas supplied from a combustor to flow in the turbine; and a rotor comprising a disk and multi-stage blades installed inside the casing so as to rotate the rotor by the flow of combustion gas, the multi-stage blades installed on an outer peripheral surface of the disk and each stage of blades arranged between successive stages of the vanes, wherein each of the vanes comprises:

an airfoil configured to be installed on an inner peripheral surface of the casing and to guide combustion gas from a front-stage blade to a rear-stage blade; and a pair of shrouds coupled to the airfoil, each shroud having an airfoil-side surface that faces toward the airfoil, at least one of the shrouds having a plurality of cooling holes formed in the airfoil-side surface and configured to direct cooling air toward the airfoil to cool surfaces of the airfoil, wherein the plurality of cooling holes include a plurality of first cooling holes and a plurality of second cooling holes, the airfoil-side surface includes a proximal portion and a distal portion, the proximal portion extending between the airfoil and an imaginary line that is spaced apart from and surrounds the airfoil, the distal portion having no cooling holes and extending beyond the imaginary line away from the airfoil, the plurality of first cooling holes are disposed along the imaginary line, and the plurality of second cooling holes are disposed so as to occupy the proximal portion, the pair of shrouds comprise an inner shroud coupled to an inner end of the airfoil; and an outer shroud coupled to an outer end of the airfoil, and the imaginary line occurs on the airfoil-side surface of both of the inner and outer shrouds, such that the first and second cooling holes are formed in at least one of the inner and outer shrouds, and wherein the imaginary line is an inner line of a figure formed by a circle, which is formed around a center of gravity of the at least one of the inner and outer shrouds and the radius of which is defined as the shortest among distances between the center of gravity and respective vertices of the at least one of the inner and outer shrouds, and a pair of straight lines which are parallel to the longest among lines connecting the center of gravity and the respective vertices of the at least one of the inner and outer shrouds while passing through points at which the circle meets edges of the at least one of the inner and outer shrouds.

* * * * *